US006558552B1

(12) United States Patent
Loos-Neskovic et al.

(10) Patent No.: US 6,558,552 B1
(45) Date of Patent: May 6, 2003

(54) COMPOSITE MATERIAL BASED ON HEXACYANOFERRATES AND POLYMER, METHOD FOR MAKING IT AND USE

(75) Inventors: Christiane Loos-Neskovic, Fontenay aux Roses (FR); Claire Vidal-Madjar, Paris (FR); Jacqueline Dulieu, Malakoff (FR); Anastasia Pantazaki, Thessaloniki (GR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/147,792

(22) PCT Filed: Jul. 8, 1998

(86) PCT No.: PCT/FR98/01471

§ 371 (c)(1),
(2), (4) Date: Mar. 9, 1999

(87) PCT Pub. No.: WO99/02255

PCT Pub. Date: Jan. 21, 1999

(30) Foreign Application Priority Data

Jul. 9, 1997 (FR) .............................. 97 08723

(51) Int. Cl.⁷ ............................... C02F 1/28; C02F 1/42
(52) U.S. Cl. ....................... 210/679; 210/682; 210/684; 210/688; 502/402; 521/28
(58) Field of Search .............................. 210/679, 502.1, 210/682, 684, 688; 502/402; 521/28

(56) References Cited

U.S. PATENT DOCUMENTS

| 2,670,334 | A | * | 2/1954 | D'Alelio ..................... 210/679 |
| 4,245,005 | A | * | 1/1981 | Regnier et al. ............. 502/402 |
| 4,755,322 | A | | 7/1988 | Narbutt et al. .............. 252/184 |
| 4,927,539 | A | * | 5/1990 | Stevens et al. ........... 210/502.1 |
| 5,407,889 | A | * | 4/1995 | Remes ........................ 502/401 |
| 5,601,722 | A | * | 2/1997 | Tanihara ..................... 210/673 |

FOREIGN PATENT DOCUMENTS

| DE | 30 07 869 | * 11/1980 |
| DE | 30-45 921 | 10/1981 |
| DE | 38 29 654 | * 3/1990 |
| DE | 40 21 046 | 3/1991 |
| EP | 0 225 829 | 6/1987 |
| EP | 0 522 856 | * 1/1993 |
| EP | 0 575 612 | * 12/1993 |
| GB | 1115258 | 5/1968 |
| RU | 778780 | 11/1980 |

OTHER PUBLICATIONS

S. Gaur, Journal of Chromatography, No. 733, pp. 57–71, "Determination of Cs–137 in environmental water by ion-–exchange chromatography", 1996.*

R. Harjula, et al., Proc. Symp. Waste Manag., 3 pages only, "Removal of Cesium From Nuclear Waste Solutions By Potassium–Cobalt Hexacyanoferrate (II) Columns," 1987.

J. Lehto et al., Joint International Waste Management Conference, vol. 1, pp. 367–369, Solidfication of $^{137}$Cs Into Potassium Cobalt Hexacyanoferrate (II) Ion Exchanger, 1989.

Kazuo Watari, et al., Journal of Nuclear Science and Technology, vol. 4, pp. 190–194, "Isolation of $^{137}$Cs With Copper Ferrocyanide–Anion Exchange Resin," Apr. 1967.

J. Stejskal, et al., Journal of Radioanalytical Chemistry, vol. 21, pp. 371–379, "Improved Inorganic Ion–Exchangers I. Systems with Organic Polymers as Binding Materials," 1974.

Kikuo Terada, et al., Talanta, vol. 17, pp. 955–963, "Silica Gel as a Support for Inorganic Ion Exchangers for the Determination of Caesium–137 in Natural Waters," 1970.

Chemical Abstracts, vol. 79, p. 212 only, AN 149757, 1973.

J. L. Cox, et al., Proceedings of the First Hanford Separation Science Workshop, 4 pages, Table of Contents only, Jul. 1991.

R. Caletka, et al., Fresenius Z. Anal Chem, pp. 19–20, "Preconcentration of Radiocaesium From Water Samples on Zinc Hexacyanoferrate Bounded in AGAR AGAR Gel," 1987.

V. N. Zaitsev, et al., Analytica Chimica Acta, pp. 323–329, "Immobilization of Large–Low–Charge Anions for the Preparation of Selective Caesium Adsorbents," 1992.

Derwent Abstract, AN 78–30711A, JP 78–026779, Mar. 13, 1978.

* cited by examiner

*Primary Examiner*—Ivars Cintins
(74) *Attorney, Agent, or Firm*—Oblon, Spivak, McClelland, Maier & Neustadt, P.C.

(57) ABSTRACT

The invention relates to a composite solid material fixing mineral contaminants, with a metal hexacyanoferrate basis, characterised in that it comprises a solid support coated with a pellicle of an anion-exchange polymer to which is fixed an insoluble metal hexacyanoferrate forming a thin layer.

The present invention also relates to the method of preparing the said composite solid material fixing mineral contaminants with a hexacyanoferrate basis.

The present invention finally relates to method of fixing, which can be carried out in a column and continuously, of at least one mineral contaminant contained in a solution, on the said composite solid material fixing mineral contaminants.

The said solution is in particular a liquid or an effluent originating from the nuclear industry and installations.

28 Claims, No Drawings

COMPOSITE MATERIAL BASED ON HEXACYANOFERRATES AND POLYMER, METHOD FOR MAKING IT AND USE

DESCRIPTION

The present invention relates to a composite solid material fixing mineral contaminants, with a basis of hexacyanoferrates and cationic polymer deposited in a pellicular layer on a support.

More precisely, the object of the present invention is a composite solid material fixing mineral contaminants formed from a mechanically and chemically stable solid support coated with a pellicle of an anion-exchange polymer to which a thin layer of insoluble hexacyanoferrate is fixed.

The present invention also relates to the method of preparing the said composite solid material fixing mineral contaminants with a hexacyanoferrate basis.

The present invention finally relates to method of fixing at least one mineral contaminant contained in a solution, on the said composite solid material fixing mineral contaminants.

Many mineral fixers have been used for fixing various mineral contaminants such as metallic cations contained in the various effluents and media originating from various industries and in particular from the nuclear industry.

In fact, the nuclear industry uses, for the treatment of low- or medium-radioactivity effluents, purification techniques with volume reduction consisting of the fixing on a mineral solid of radioisotopes present in the solutions. The volumes treated currently are huge and reach several tens of thousands of m$^3$/year for France. The liquids treated are also of a varied nature since treatment of both nuclear power station cooling waters and the various effluents coming into contact with radioisotopes such as all the wash water, the resin regeneration solutions, etc. is concerned.

Among the mineral fixers used notably in the nuclear industry can be cited the Manox® type products with an oxides of manganese basis which are used for fixing elements present in solution, in various chemical forms, the said elements being for example Ag, Sb, Ra or Pb; iron hydroxide used for fixing, by coprecipitation, the transuranic elements, and finally the insoluble hexacyanoferrates (II or III).

The hexacyanoferrates, notably the hexacyanoferrates (II) of Cu, Ni and Co, are in fact among the mineral fixers most commonly used, in particular in the nuclear industry owing to the great affinity they have with regard to caesium. Hexacyanoferrate type inorganic fixers have therefore notably been used for separating, recovering and fixing metallic ions and in particular the ions of radioactive alkali metals such as long half-life caesium 137 from various industrial and nuclear effluents, for example from strongly acid solutions originating from the reprocessing of irradiated fuels and from the solutions already referred to above.

At present, insoluble hexacyanoferrates thus enter into the majority of methods of treating liquid radioactive waste by coprecipitation.

Mineral fixers and in particular hexacyanoferrates, although they sometimes have high selectivities, have however the basic failing of having a low intrinsic durability, in other words a poor mechanical strength which makes it difficult, perhaps even impossible, to pack them in a column because of a reduction in the volume occupied by the fixer and a clogging-up which moreover limits the number of applications.

Thus these fixers, when they are prepared in powder form, form mechanically unstable grains; in addition, in compact form in a mass, their small specific surface often leads to slow reaction kinetics which greatly limits their effectiveness.

In fact it is generally difficult to alloy a compact form with a high reaction speed.

At the present time, insoluble hexacyanoferrates in a mass, although otherwise commonly made use of, are used, it seems, industrially in columns only in Finland, as described in the document by R. HARJULA, J. LEHTO, J. WALLACE: "Removal of cesium from nuclear waste solutions by potassium-cobalt hexacyanoferrate (II) columns", Proc. Symp. Waste Manag., Tucson, Ariz., 1987, 3, p.93, and in the document by J. LEHTO, R. HARJULA, S. HAUKKA, J. WALLACE: "Solidification of $^{137}$Cs into KCo hexacyanoferrate (II) ion exchanger", Joint Int. Waste Manag Conf., Kyoto, Japan, 1989.

Cobalt hexacyanoferrates (II) in a mass are concerned, which are used for treating only limited volumes of solutions because of clogging-up.

Many publications report researches in order to prepare phases of good mechanical strength from mineral fixing compounds such as hexacyanoferrates.

There has thus been proposed in the documents by K. WATARI, K. IMAI and M. IZAWA, J. Nucl. Sci. Technology, 1967, 4, 190–194 "Isolation of $^{137}$Cs with copper ferrocyanide-anion exchange resin", by J. STEJSKAL, J. SOUKUP, J. DOLEZAL and V. KOURIM, J. Radioanal. Chem., 1974, 21, 371–379 "Improved inorganic ion-exchangers I. Systems with organic polymers as binding materials", and in the patent U.S. Pat. No. 4,755,322, the preparation of composite organic resins which can incorporate a high proportion of mineral compound such as a hexacyanoferrate.

The stability of these composite materials is satisfactory but the majority presence of organic compounds greatly limits the possibilities of use, all the more so since the active mineral part retains the bulk of its characteristics and in particular the non-reversibility of the fixing.

In general, the methods concerning improvement in performance of mineral fixers call upon in-situ precipitation in the presence of silica.

This is notably the case of the precipitation of hexacyanoferrates, in the document by K. TERADA, H. HAYAKAWA, K. SAWADA and T. KIBA, Talanta, 1970, 17, 955–963 "Silica gel as a support for inorganic ion-exchangers for the determination of $^{137}$Cs in natural waters", the Russian patent SU-A-77 8780 by E. K. SPIRIN et al., and the document by C. KONECNY and R. CALETKA, J. Radioanal. Chem., 1973, 14, 255–266 "Adsorption properties of insoluble hexacyanoferrates (II) supported on silica gel".

Thus, the latter document describes the fixing on silica gel of insoluble hexacyanoferrates in order to improve their mechanical properties and pack them into columns, which allows a continuous treatment of effluents. These products fixed on silica gel are prepared notably by impregnation under agitation of the silica gel with aqueous solutions saturated with potassium hexacyanoferrates (II) until a "moist solid" state is obtained, then, after drying, bringing the solid into contact with solutions comprising an excess of metallic ions, then drying once more and bringing into contact again with 0.1 M solutions of the metallic ions in order to allow precipitation on the silica of the desired hexacyanoferrate.

All the methods and products described above which call upon fixing of the mineral fixer such as hexacyanoferrates on silica have in common a number of drawbacks.

First of all, the bulk of the precipitation of the hexacyanoferrate takes place inside the pores of the silica and not on the surface which greatly reduces the effectiveness of the composite mineral fixer obtained since the surface of contact between this composite mineral fixer and the solution, represented by the specific surface of the composite, is distinctly less than the specific surface of the support, such as silica, preferably chosen from among the finely-divided silicas of large specific surface.

The so-called "coprecipitation" method proves difficult to use for amounts exceeding a few grams since there takes place in particular a phenomenon of salting-out of the excess salts.

Moreover, the composition of the final product is very poorly controlled, and its properties are not very reproducible, the proportion of hexacyanoferrate deposited being very poorly controlled by the coprecipitation. This is because the adhesion of the mineral fixer on the silica is accomplished by a purely mechanical phenomenon which means that the mineral fixer is weakly bonded to the support and can be easily detached, or leached, therefrom.

Moreover, the amounts of mineral fixer such as hexacyanoferrate are relatively high and can reach for example up to 30% by mass with respect to the mass of mineral support such as silica.

These highly excessive amounts of hexacyanoferrates used result in significant difficulties during the treatment and storage of waste, since on the one hand the hexacyanoferrate residues release hydrogen during storage, as mentioned in the document by J. L. COX et al., Proc. 1st HANFORD Separation Science Workshop Jul. 23–25, 1991, PNL-SA-21775, and on the other hand these compounds cannot be vitrified since an emission of highly toxic hydrogen cyanide takes place during the operations brought into play during vitrification.

The use of supports other than silica has also been proposed, notably in the document by R. CALETKA, H. MUNSTER and V. KRIVAN, Frezenius Z. Anal. Chim., 1987, 327, 19–20 "Preconcentration of radiocesium from water samples on zinc hexacyanoferrate bounded in agar agar gel" and the document by V. N. ZAITSEV, I. KADENKO, V. V. STRELKO and E. V. SKOPENKO, Anal. Chim. Acta, 1992, 256, 323–329 "Immobilization of large low-charge anions for the preparation of selective caesium absorbents" and other documents.

Thus, the document DE-A-3 829 654 describes the formation of a precipitate of mixed ammonium and iron hexacyanoferrate on a plastic support, for fixing caesium.

Similarly, the document DE-A-4 021 046 relates to the deposition of a mixed copper and potassium hexacyanoferrate on porous balls made of a plastic material, for example made of a highly basic anion-exchange resin with a polystyrene basis. The composite exchanger obtained is used for fixing caesium.

The document JP-A-78 026 779 describes the fixing of hexacyanoferrate (II) in a gel for separating the ions of heavy metals contained in a liquid.

The document GB-A-1 115 258 describes a column of mixed hexacyanoferrate (II) adsorbed on an ion-exchange resin or incorporated in a bed of glass fibre, for separating caesium by precipitation.

The document DE-A-3 045 921 concerns a material for fixing caesium in which an insoluble hexacyanoferrate is adsorbed in the pores of a zeolite.

All the supports mentioned above have the same drawbacks as silica, i.e., among others, the lack of control of the precipitation, the large mineral amounts and the variable properties from one preparation to another.

It appears therefore that there exists an unsatisfied requirement for a solid material fixing mineral contaminants such as cations, notably with a metal hexacyanoferrate basis, which is chemically and mechanically stable and which can thus be packed in a column allowing a continuous use.

The composite solid material fixing mineral contaminants must also have excellent fixing, in particular decontaminating, properties, i.e. similar, perhaps even superior, to those of non-impregnated hexacyanoferrates on a support, which is not the case in the prior art where the improvement in the mechanical strength obtained with a support is often made to the detriment of the fixing, in particular decontaminating, properties.

It would moreover be desirable to have a solid material fixing mineral contaminants associating a good mechanical stability with a high reaction speed unlike the products in compact form whose small specific surface leads to slow reaction speeds.

In other words, a requirement exists for a solid material fixing mineral contaminants, with a metal hexacyanoferrate basis, which has, among other things, excellent mechanical and chemical stabilities, a high affinity or decontamination coefficient, a high reactivity, and a good selectivity.

These properties must be obtained with a minimum amount of metal hexacyanoferrate type mineral fixer, in any case an amount distinctly less than that of the composite mineral fixers of the prior art.

In addition, in particular in the case of the fixing of radioactive elements, it is necessary that the composite solid material fixing mineral contaminants can be easily stored and/or vitrified with no risk by the known methods.

Finally, a requirement exists for a material having a composition and properties which are completely reproducible and controlled, and for a reliable method making it possible to prepare such a material.

The aim of the present invention is therefore to provide a composite solid material fixing mineral contaminants, with a metal hexacyanoferrate basis, which does not have the drawbacks and limitations of solid materials, in particular the composite solid materials fixing mineral contaminants of the prior art, which overcomes the problems of the materials of the prior art and which fulfils, among other things, all the requirements mentioned above.

This aim, and also others, are achieved, in accordance with the invention, by a composite solid material fixing mineral contaminants, with a metal hexacyanoferrate basis, characterised in that it comprises a solid support coated with a pellicle of an anion-exchange polymer to which is fixed an insoluble metal hexacyanoferrate forming a thin layer.

The material according to the invention has a specific structure in which the mineral fixer as such, i.e. the metal hexacyanoferrate, comes in the form of a thin layer which is immobilized on a polymeric phase fixed on a support, the said support being solid and, advantageously, chemically and mechanically stable, and being protected and isolated from the action of the environment by the underlying polymer layer.

Therefore the material according to the invention is also chemically and mechanically stable and associates these stabilities with a high reaction speed, and is completely suited to packing in a column.

By way of example, the mechanical stability of the material according to the invention has shown itself to be perfect in a column, after washing with pure water for several days, corresponding to more than 10,000 column volumes.

In the material according to the invention, the hexacyanoferrate anion is adsorbed on the polymer, by electrostatic type interactions, and therefore adheres strongly to the support.

The bond which exists between the anionic part of the metal hexacyanoferrate and the support coated with the anion-exchange polymer is an electrostatic type bond, which is not a weak bond of a mechanical nature essentially bringing into play phenomena of adsorption in the pores as is the case in the impregnated hexacyanoferrates, for example on a silica gel, of the prior art.

The deposition of the hexacyanoferrate is performed uniformly over the whole modified surface of the support.

All possible exchange sites of the anion-exchange polymer are exchanged; the composition and properties of the material according to the invention are therefore completely controlled and reproducible unlike the materials of the prior art. There no longer exists at the surface of the material any residual hexacyanoferrate, in excess, capable of being salted out and subsequently disrupting the fixing process.

The material according to the invention moreover has a contact surface which is of the same order of magnitude as the specific surface of the chosen support. Consequently, the reactivity of the hexacyanoferrate is increased.

The distribution coefficient of the material according to the invention, which is preferably from 10,000 to 100,000 for one gram of material, is high and comparable to that of the hexacyanoferrates in a mass but the amounts of hexacyanoferrates used are advantageously much smaller than those of the impregnated hexacyanoferrates on silica of the prior art.

Thus the material according to the invention generally comprises an amount of fixed metal hexacyanoferrate of 1 to 10% by weight, preferably of 2 to 3% by weight, with respect to the mass of the support; this value is to be compared to the value of 30% given above.

The amount of ferrocyanide which is fixed and thrown out at the end of its use is limited, and the same effectiveness is obtained for an amount for example ten times lower of hexacyanoferrate, since all the product fixed is effective.

This in particular is the reason why it is possible to easily store the material according to the invention, which is stable and essentially mineral, and/or to vitrify it which was until now impossible with the materials of the prior art.

More precisely, the solid support can be chosen from among the supports known to persons skilled in the art and suitable for the use described; these solid supports can be organic or mineral and are generally chosen from among the chemically and mechanically stable solid supports.

The support will thus be chosen preferably from among the mineral oxides such as silica, aluminium oxide, titanium oxide, zirconium oxide, diatomaceous earth, glasses and zeolites; a preferred support is silica, easily available at a reasonable cost.

The support can come in any form, for example in the form of particles such as grains, balls, spheres, in the form of fibres, or some other form, or in the form of a membrane, a hollow tube, woven or non-woven fabric, etc.

The granulometry of the support, in particle form, defined by the size of the particles, i.e. the diameter in the case of spherical particles, can vary within wide limits and will generally be from 1 to 500 $\mu$m, preferably greater than or equal to 10 $\mu$m, preferably again greater than or equal to 30 $\mu$m, for example in the column tests.

The specific surface of the support can also be variable, for example from 10 to 500 m$^2$/g, preferably 30 to 500 m$^2$/g.

The support is preferably a porous support in order to allow a better fixing of the polymer.

The mean size of the pores of the support is variable, and is preferably from 100 to 1000 Å.

The anion-exchange polymer of the composite solid material fixing mineral contaminants according to the invention originates from an organic polymer which has possibly been provided with cationic groupings by any method known to persons skilled in the art.

This organic polymer is chosen preferably from among the polyvinylimidazoles, the copolymers of vinylimidazole with at least one other monomer for example a vinyl monomer, the polyethyleneimines, the polyamines and any polymer carrying a cationic grouping or similar or capable of being provided therewith.

Examples of these polymers are given for example in the document EP-A-0 225 829 and the document DE-A-30 07 869.

Any polymer is suitable provided that it forms a pellicle, or film, which adheres strongly to the surface of the support, for example by adsorption in the pores or by covalent bonding with the help of a suitable graft, and that it carries, or can carry, cationic groupings.

Furthermore, and for a better strength of the polymer adsorbed on the support, it is generally preferable to carry out a cross-linking of the polymer.

For grafted polymer, cross-linking is generally not necessary.

The metal hexacyanoferrate which is fixed to the anion-exchange polymer can be any hexacyanoferrate known to persons skilled in the art; it can be chosen for example from among the hexacyanoferrates of copper, cobalt, zinc, cadmium, nickel, iron, and the mixed hexacyanoferrates relating to these salts.

The invention also relates to a method of preparing the composite solid material fixing mineral contaminants, with a hexacyanoferrate basis, described above, this method being characterised in that it comprises the following steps:

impregnation of a solid support with a solution of an organic polymer, in order to form a pellicle of the said organic polymer on the said solid support;

possible cross-linking of the said polymer (adsorbed in particular) with a cross-linking agent;

possible creation of cationic groupings on the said cross-linked organic polymer;

impregnation of the solid support thus coated with a pellicle of anion-exchange polymer with a solution of alkali metal hexacyanoferrate;

washing and possibly drying of the said solid support coated with a pellicle of anion-exchange polymer to which an alkali metal hexacyanoferrate is fixed;

addition of an aqueous solution of a metallic salt to the said coated solid support, in order to form a composite solid material fixing mineral contaminants, comprising the solid support coated with a pellicle of anion-exchange polymer to which is fixed an insoluble metal hexacyanoferrate forming a thin layer;

washing and drying.

This method is simple, calls upon known and tested processes, is reliable and completely reproducible, i.e. it allows the preparation of a final product whose characteristics, composition and properties are completely determined, and are not subject to random variations.

The preparation method according to the invention is thus totally distinguished from the methods of the prior art, notably those calling upon a simple precipitation on a support.

The invention finally relates to method of fixing at least one mineral contaminant such as a metallic cation contained in a solution, by bringing the said solution into contact with the composite solid material fixing mineral contaminants, described above.

The invention will now be described in more detail in what follows, making reference in particular to the preparation method.

The first step of this method consists of the impregnation of a solid support with an organic polymer solution on the said solid support.

The solid support is one of those which have already been mentioned above, a preferred support being the Lichrosphere® 100 silica from the Merck® company; the polymer is also one of those which have been referred to above.

The polymer solution is a solution in any solvent, chosen for example from among water and the alcohols such as ethanol, methanol and mixtures thereof.

The solution is preferably a concentrated solution, i.e. the concentration of the polymer in the solvent is generally 40 g/l.

The impregnation is carried out by bringing the solid support into contact with the polymer solution for a sufficient time, for example 24 to 48 hours, for which a uniform coating of polymer is obtained on the solid which isolates and protects the solid support, embraces the forms and porosities thereof and retains the specific surface thereof.

The fixing of the polymer on the solid support is essentially governed by a phenomenon of adsorption on a number of anchorage points, but a graft by means of a covalent bond or bonds can be envisaged.

In a second step, the said polymer, when it is adsorbed, is possibly cross-linked with a cross-linking agent in order to stabilize the polymer layer adsorbed on the surface.

This cross-linking agent depends on the polymer used and can easily be determined by persons skilled in the art; this agent is chosen for example from among the bifunctional reagents capable of reacting with the polymer such as epichlorohydrin, 1,4-butanediol diglycidyl ether (BUDGE), the bis-epoxides, etc.

A preferred cross-linking agent for the polyvinylimidazole (PVI) or polyethyleneimine (PEI) type polymers is 1,4-butanediol diglycidyl ether (BUDGE) marketed for example by the ALDRICH company. In the case of the polyethyleneimines, a cross-linking technique is described in the document DE-A-3 007 869.

The cross-linking operation is generally achieved in 24 hours.

The following step consists of creating cationic groupings on the said possibly cross-linked organic polymer. It is however possible that the organic polymer, possibly cross-linked, already includes cationic groupings or similar; it is then not necessary to have recourse to this step.

These cationic groupings can be any cationic grouping known to persons skilled in the art, such as ammonium, phosphonium, sulphonium, etc.

The creation of the cationic groupings can be performed by any technique known to persons skilled in the art, and is a function notably of the structure of the polymer and the cationic grouping sought.

Thus, in the case of a polymer having nitrogen atoms, such as a polyvinylimidazole, a quaternization technique will preferably be used.

Such a technique is described for example in the document EP-A-0 225 829 as regards the polyvinylimidazoles. For example, quaternization of the atom situated in position 3 of the imidazole nucleus is performed in a known manner by means of an alkylating agent.

For example a reactive halogenated hydrocarbon such as iodomethane, an epoxide, a polyepoxide or an epihalohydrin such as epichlorohydrin, can be made to act on the polyvinylimidazole deposited on the solid support by preparing a suspension of the impregnated solid support in a solution of the alkylating reagent, preferably in a polar solvent such as an alcohol, for example methanol, ethanol or isopropanol, at ambient temperature or under heat, and preferably at a temperature around 60° C. or less than about 50° C.

At the end of this possible step of creating cationic groupings on the said polymer, a solid support coated with a pellicle of anion-exchange polymer is thus obtained.

Pellicle means, as already indicated above, a uniform coating over the whole surface of the solid support which substantially retains the specific surface of the latter.

This pellicle generally has a thickness of 200 to 300 nm.

In the following step, the support coated with a pellicle of anion-exchange polymer is next impregnated with an aqueous solution of alkali metal hexacyanoferrate (II) or (III).

The initial alkali metal hexacyanoferrate is chosen preferably from among the hexacyanoferrates (II) and (III) of sodium or of potassium.

The aqueous solution of alkali metal hexacyanoferrate used has a variable concentration, i.e. the concentration of the alkali metal, in particular potassium or sodium, hexacyanoferrate (II) or (III) salt is preferably from 1 to 100 g/l, for example 50 g/l.

Furthermore, the aqueous solution of hexacyanoferrate used is prepared so that the mass ratio of the alkali metal, in particular potassium or sodium, hexacyanoferrate (II) or (III) salt to the amount of the impregnation support essentially composed of the initial solid support such as silica, is preferably from 5 to 10%.

The impregnation is carried out preferably at a defined pH, set, for example at a pH of 2 to 7 such as 2, 4 or 7. The pH is controlled for example by a suitable buffer such as a 2.10–2 M TRIS-HCl buffer at pH 7, or by a 20 mM acetate buffer at pH 4, or by a citrate buffer at pH 2.

Thus the fixing is obtained of the anionic part $[Fe(CN)_6]^{4-}$ on the cationic groupings of the polymer, this fixing being made by formation of electrostatic type bonds which are relatively strong, depending on to the medium, and this fixing is generally quantitative, i.e. all the cationic sites of the polymer react. The fixing therefore has no random character.

The solid support thus coated with a pellicle of anion-exchange polymer to which an alkali metal hexacyanoferrate is fixed is next subjected to a washing, and possibly a drying, operation.

The aim of the washing operation is to eliminate the alkali metal hexacyanoferrate salts which have not been fixed on the polymer and make it possible to obtain a composite material fixing mineral contaminants in which there no longer exists any free, non-bonded hexacyanoferrate, capable of being salted-out.

The washing can be performed with demineralized water, or with a buffer similar to that used during the previous step.

The amount of rinsing solution used is variable and can be from 100 to 1000 ml per gram of product treated.

Following this washing/rinsing, a drying treatment is possibly performed, which can for example be carried out under vacuum at ambient temperature.

The drying time is variable and can be for example from 2 hours to 24 hours.

The following step is the addition of an aqueous solution of metallic salt to the solid support coated with a pellicle of an anion-exchange polymer, to which the hexacyanoferrate anion is fixed.

The metal salt contained in this aqueous solution is a salt of which the metal corresponds to the insoluble hexacyanoferrate which it is wished to obtain as has already been indicated above.

This metal is chosen for example from among copper, cobalt, zinc, cadmium, nickel and iron, etc. D The metal salt will therefore be for example a nitrate, a sulphate, a chloride, or an acetate of one of these metals at a concentration in the aqueous solution preferably of 0.01 to 1 mol/l, preferably again of 0.02 to 0.05 mol/l. The amount of salt used is furthermore preferably around 0.4 mmole/g of support treated.

Preferably, the addition of the aqueous solution of the metal salt is carried out at a defined pH, for example 2 to 7, such as 2, 4 or 7, using demineralized water or by fixing the pH with the help of a buffer solution similar to that already used above (TRIS buffer or Acetate buffer or citrate buffer), depending on the polymer used.

Finally in a last step the washing is performed of the final material obtained which thus comprises the solid support coated with a pellicle of an anion-exchange polymer to which is fixed an insoluble metal hexacyanoferrate forming a thin layer.

This last washing step is performed in the same way and under the same conditions as the washing step already described above. According to the polymer used, a buffer similar to the one already used above or demineralized water is used.

This washing operation makes it possible to eliminate the excess metal salt and obtain a stable final product with the composition completely defined.

Finally a drying step is performed under the conditions analogous to those described above.

Generally, the drying is continued until the mass of the support remains substantially constant.

The content by weight of cation exchangers, i.e. of insoluble metal hexacyanoferrate fixed on the anion-exchange polymer, is generally from 1 to 10%, for example 3%, with respect to the mass of the mineral support such as silica. It has been noted by neutron activation analysis that the $M_2$/Fe atomic ratio can vary from 1 to 5 without the fixing, in particular decontamination, properties being affected.

The composite solid material fixing mineral contaminants according to the invention can be used notably, but not exclusively, in a method of fixing at least one mineral contaminant for example a metallic cation contained in a solution, in which the said solution is brought into contact with the said composite solid material fixing mineral contaminants.

The materials according to the invention, on account of their excellent properties such as an excellent exchange capacity, an excellent selectivity and a high reaction speed, are particularly suited to such a use.

This excellent effectiveness is obtained with reduced amounts of mineral fixer such as insoluble hexacyanoferrate.

In addition, the excellent mechanical strength and stability properties of the material according to the invention, resulting from its specific structure, allow its packing in a column and the continuous use of the fixing method, which can thus be easily integrated into an existing installation, for example into a treatment line or chain comprising a number of steps.

The solutions which can be treated by the method of the invention and with the composite solid material fixing mineral contaminants according to the invention are very varied, and can even contain for example corrosive agents, acids, bases or others, on account of the excellent chemical stability of the material according to the invention.

The material according to the invention is usable in particular over a very wide pH range. For example it is possible to treat nitric aqueous solutions of concentration ranging for example from 0.1 to 3M, acid or neutral solutions up to pH 8, basic solutions etc. It is necessary however to possibly adapt the nature of the solid support to the nature of the solution treated. It is for example known that silica generally does not withstand a basic pH, and that it is then preferable to use a solid support for example made of $TiO_2$; the use of the composite material can then be extended for example up to pH 12.

The mineral contaminant capable of being fixed in the method according to the invention can be any mineral contaminant, i.e. for example any contaminant originating from (with a basis of) a metal or an isotope, preferably a radioactive isotope, of this metal, capable of being in solution.

This contaminant is chosen preferably from among the anionic complexes, the colloids, the cations and mixtures thereof.

It is preferably a contaminant, such as a cation originating from-an element chosen from among Tl, Fe, Cs, Co, Ru, Ag, . . . and the isotopes, in particular the radioactive isotopes, thereof, among which can be cited 50Co, 60Co, 55–59Fe, 134Cs, 139Cs, 103,105,106,107Ru. The metallic cation is in particular caesium $Cs^+$ or thallium $Co^{2+*}$.

The anionic complex is for example $RuO_4^{2-}$.

A preferred use of the material according to the invention is the fixing of caesium which contributes towards a large part of the gamma activity of liquids of the nuclear industry and which is fixed selectively by the hexacyanoferrates.

The concentration of the contaminant or contaminants such as a cation or cations can vary between wide limits: for example it can be for each of them from 0.1 picograms to 10 mg/l, preferably 0.01 mg/l to 10 µg/l.

The solution to be treated by the method of the invention is preferably an aqueous solution, which can, besides the contaminant or contaminants such as one or more cations to be fixed, contain other salts in solution such as $NaNO_3$ or $LiNO_3$ or $Al(NO_3)_3$ or any other soluble alkali or alkaline earth metal salt at a concentration which can reach 2 moles/l. The solution can also contain, as indicated above, acids, bases, and even organic compounds.

The solution to be treated can also be a solution in a pure organic solvent such as ethanol (absolute alcohol), acetone or some other, in a mixture of these organic solvents, or in a mixture of water and one or more of these organic solvents miscible with water.

The material according to the invention thus has the advantage of being able to treat solutions which cannot be treated with organic resins.

This solution can consist of a process liquid or an industrial or other effluent which can originate in particular from the nuclear industry and installations or from any other activity related to nuclear energy.

Among the various liquids and effluents of the nuclear industry, nuclear installations and activities using radionuclides which can be treated by the method of the invention can be cited for example the cooling waters of power stations, and all the various effluents coming into contact with radioisotopes such as all the wash waters, the resin regeneration solutions, etc.

It is however obvious that the method according to the invention can also be used in other fields of activity, industrial or other, non-nuclear fields.

Thus, hexacyanoferrates selectively fix thallium and this property could be taken advantage of in the purification of cement works effluents in order to reduce or remove the discharges and emissions of this element which is a violent poison.

It has been seen that the fixing method according to the invention is preferably used continuously, the cation-exchange material according to the invention, preferably in particle form, then being packed for example in column form, but the fixing method can also be used intermittently, in "batch" mode, the exchanger material and the solution to be treated then being brought into contact preferably under agitation. Packing in a column makes it possible to continuously treat large amounts of solution, with a high throughput thereof.

The time of contact of the solution to be treated with the exchanger material is variable and can be from 1 minute to 1 hour for a continuous operation and from 10 minutes to 24 hours for a "batch" operation.

At the end of the fixing method, the fixing composite solid material (exchanger) according to the invention, in which for example the metal cations of the hexacyanoferrate have been exchanged with the cations in the solution, can be stored directly, since its very high mechanical and chemical stabilities and essentially mineral nature allow such a storage without there taking place any degradation of the product leading to emanations of hydrogen, or it can be treated by a method allowing a packing for long-term storage for example by vitrification.

Vitrification is particularly suitable where the cations fixed are radioisotopes and where the support is silica.

The material according to the invention, by virtue of its specific structure, and unlike the exchanger materials of the prior art with a hexacyanoferrate basis, can be vitrified without danger since the amounts of mineral fixer are limited and decontamination in air is without danger.

Finally, it would also be possible to elute the fixed cation, such as a radioactive element cation, by selective dissolving of the support for example with the help of a concentrated soda solution.

The capability of storing, of treating for example by vitrification, safely and reliably, the material according to the invention with a hexacyanoferrate basis, constitutes one of the advantages of the invention and provides a solution to one of the main unsolved problems presented by all exchangers of the prior art whether they are notably in a mass or composite.

The following examples, non-limitative and given by way of illustration, illustrate the preparation of composite exchanger materials according to the invention and the results obtained by use of these composite exchanger materials within the context of a cation fixing method according to the invention applied to the fixing of cobalt and caesium from radioactive effluents.

EXAMPLE 1

In this example, the synthesis has been carried out of hexacyanoferrates in a thin layer, immobilized on silicas covered with an anion-exchange polymeric phase, the said phase being prepared from different polymers.

EXAMPLE 1A

In this example, the anion-exchange polymer is prepared from polyvinylimidazole (PVI) having the following structure and characteristics: Molar mass measured by viscometry, $M_w=16000$.

The method of operation is as follows:

A Lichrosphere® 100 silica support, supplied by the Merck® company, having a particle diameter of 10 $\mu$m and a porosity of 100 Å, is impregnated with polyvinylimidazole (PVI) by being brought into contact for 24 hours in a concentrated, i.e. 40 g/l, solution of polymer in methanol.

The support thus coated is next cross-linked with BUDGE and quaternized with methyl iodide according to the method described in the document EP-A-0 225 869 by B. Sebille et al.

The exchange capacity of this support was measured at pH 7 by adsorbing a 1M NaCl solution and exchanging it with a 0.5M $NaNO_3$ solution.

The capacity of the anion exchanger is 0.6 meq per g of silica.

The anion-exchange pellicular support is impregnated with a concentrated solution of potassium hexacyanoferrate II (50 g/l) in the presence of a $2.10^{-2}$ M TRIS-HCl buffer at pH 7.

The support is next washed in the same buffer and then dried.

A copper hexacyanoferrate (II) is formed on the pellicular surface by addition of an aqueous solution of $2.10^{-1}$ M copper (II) nitrate in demineralized water.

The excess of copper is eliminated by washing with demineralized water.

The elementary analysis of the final product obtained is given in Table I below.

EXAMPLE 1B

In this example, the exchanger polymer is prepared from polyethyleneimine (PEI) having a mean molecular mass $M_u$ of 25000 supplied by the ALDRICH company (reference 40 872-7).

The method of operation is as follows:

A Lichrosphere® 100 silica support, supplied by the Merck® company, having a particle diameter of 60 to 200 $\mu$m, and a porosity of 100 Å, is impregnated with polyethyleneimine (PEI) by being brought into contact for 24 hours in a concentrated, i.e. 40 g/l, solution of polymer in methanol.

The support thus coated is next cross-linked with BUDGE.

The exchange capacity of this support was measured in the same way as in example 1A but taking place at pH 4.

The capacity of the anion exchanger is 0.9 meq per g of silica.

The anion-exchange pellicular support is impregnated with a concentrated solution of sodium hexacyanoferrate (II) at 50 g/l in the presence of a 20 mM acetate buffer at pH 4.

The support is next washed in the same buffer and then dried.

A copper hexacyanoferrate (II) is formed on the pellicular surface by addition of a solution of $2.10^{-1}$ M copper (II) nitrate in the same buffer.

The excess of copper is eliminated by washing with the acetate buffer.

The elementary analysis of the final product obtained which contains by weight around 90% silica is given in Table I.

Table I also indicates the elementary compositions of the intermediate products obtained during preparation of the final products of Examples 1A and 1B.

These intermediate products of Examples 1A and 1B designated respectively by Int.Ex.1A and Int.Ex.1B are constituted respectively by the silica support coated with a cationic PVI pellicle to which potassium hexacyanoferrate is fixed, and by the silica support coated with a cationic PEI pellicle to which sodium hexacyanoferrate is fixed; the latter product contains by weight around 90% silica.

TABLE 1

Elementary composition of the materials according to the invention with a copper hexacyanoferrate basis and of the intermediates for preparation thereof (the percentages are mass percentages per g of silica)

| Product | % Cu | % Fe | Cu:Fe (at:at) |
|---|---|---|---|
| Int. Ex. 1A | <0.01 | 1.2 | — |
| Final Ex. 1A | 1.2 | 1.2 | 0.9 |
| Int. Ex. 1B | 0.02 | 1.3 | — |
| Final Ex. 1B | 4.1 | 1.6 | 2.3 |

EXAMPLE 2

Caesium and Cobalt Column Fixing Tests

In this example, a study was made of the fixing in a column of radioactive caesium $^{134}$Cs and $^{137}$Cs contained in various effluents, on various products with a hexacyanoferrate basis, namely:

the composite exchanger materials according to the invention prepared in Examples 1A and 1B above;

the intermediate products, already described above, of Examples 1A and 1B;

the initial product of Example 1A i.e. a product comprising the silica support coated with PVI polymer;

by way of comparison, hexacyanoferrates in a mass of the prior art and a composite resin of the prior art.

The hexacyanoferrates in a mass are:

a copper hexacyanoferrate $Cu_2Fe(CN)_6$ at 95.7% copper prepared in the laboratory ("lab mass"), an industrial hexacyanoferrate which is a mixed cobalt and potassium hexacyanoferrate with the formula $Co_{2-x}K_{2x}Fe(CN)_6$ at 91% Co and 2% potassium available from the LEHTO® company ("Industrial mass 1"), an industrial hexacyanoferrate which is a mixed copper and potassium hexacyanoferrate with the formula $Cu_{2-x}K_{2x}Fe(CN)_6$ ("Industrial Mass 2") available from the STMI (Société des Techniques en Milieu Ionisant) company.

The composite hexacyanoferrate ("composite") is a copper hexacyanoferrate incorporated in a phenolic resin, in the proportion of 24% mineral solid in the final product. This hexacyanoferrate was prepared according to the method of operation given in the document U.S. Pat. No. 4,755,322 by J. NARBUTT et al.

The effluents treated are real effluents originating from the OSIRIS reactor at the SACLAY nuclear research centre whose characteristics relating to radioactivity are stated in Table II. They are, on the one hand, reactor cooling water which is designated by "OSI" in the table and whose pH is neutral and, on the other hand, resin rinsing solution which is designated by "BF6" in the table and which is constituted by a 0.1 M nitric acid solution. In order to increase the accuracy of the counts, a $^{134}$Cs tracer was added to the OSI solution.

TABLE II

Radioactivity of the solutions treated in curies per m³.

| | $^{134}$Cs | $^{137}$Cs | $^{60}$Co |
|---|---|---|---|
| OSI | 1.02* | 0.36** | 4.1 × 10⁻² |
| BF6 | 0.52 | 2.96 | 0.56 |

*Tracer added
**Very variable depending on the solution

The method of operation for the tests is as follows:

20 mg of product are added to 50 cm³ of solution to be treated and agitated for a duration of 10 minutes or one day depending on the test.

At the end of the chosen duration, the solution is filtered, its radioactivity is measured and compared to that of a reference.

The values thus obtained make it possible to calculate the distribution coefficient of the caesium $K_d$ 137Cs representing the affinity of the product with this element; it is defined by the ratio of the radioactivity fixed per gram of product to the residual radioactivity in solution per cm³ of solution. In other words the distribution coefficient $K_d$ of the caesium is worked out according to the relationship:

$$\frac{\text{Radioactivity of caesium 137 or 134 trapped on the exchanger}}{\text{Radioactivity of caesium 137 or 134 remaining in solution}} \times$$

$$\frac{\text{Volume of solution treated (cm}^3)}{\text{Mass of exchanger used (g)}}$$

The results of tests performed for different durations (10 minutes and 1 day) with different solutions ("OSI" cooling water at pH around 7, and "BF$_6$" resin washing water, i.e. 0.1 M nitric solution) and with different products with a hexacyanoferrate basis are gathered together in Table III below:

TABLE III

Distribution coefficients Kd of caesium on various products with a hexacyanoferrate basis (per g of product)

| | OSI cooling water (pH ≈ 7) | | BF6 resin washing water (0.1 M HNO₃) | |
|---|---|---|---|---|
| PRODUCT | 10 min | 1 day | 10 min | 1 day |
| Composite | 1900 | >100000 | 500 | >20000 |
| Lab mass | 4000 | 300000 | 19500 | 9200 |
| Industrial mass 1 | 1100 | 3100 | 5000 | >50000 |
| Industrial mass 2 | 9000 | >100000 | >20000 | 7500* |
| Initial product Ex 1A | 280 | | 690 | |

TABLE III-continued

Distribution coefficients Kd of caesium on various products with a hexacyanoferrate basis (per g of product)

| PRODUCT | OSI cooling water (pH ≈ 7) | | BF6 resin washing water (0.1 M HNO$_3$) | |
| --- | --- | --- | --- | --- |
| | 10 min | 1 day | 10 min | 1 day |
| Int. Ex. 1A | 100 | | 4400 | |
| Final Ex. 1A | 90000 | 260000 | 3500 | 5800 |
| Int. Ex. 1B | 350 | 260 | 5800 | 7600 |
| Final Ex. 1B | 1200 | 42000 | 1400 | 9500 |

*Presence of colloids

The results indicated above show that the decontamination factors obtained with the materials of the invention are slightly lower than those of the products in a mass. But the materials according to the invention have an excellent mechanical stability in a column and the amounts of hexacyanoferrates used with the material of the invention are distinctly less than in the other cases and their composition makes them easily vitrifiable.

What is claimed is:

1. A composite solid material for fixing a mineral contaminant, comprising:

a solid support coated with a pellicle of an anion-exchange polymer to which an insoluble metal hexacyanoferrate is fixed;

wherein said metal hexacyanoferrate forms a thin layer on said anion-exchange polymer; and wherein an amount of fixed metal hexacyanoferrate is 1 to 10% by weight based on the mass of the solid support.

2. The material as claimed in claim 1, wherein the support is selected from the group consisting of silica, aluminum oxide, titanium oxide, zirconium oxide, diatomaceous earth, a zeolite and a glass.

3. The material as claimed in claim 1, wherein the support is in the form of particles, fibres, a membrane, a hollow tube, or woven or non-woven fabric.

4. The material as claimed in claim 3, wherein the support is in the form of particles, and has a granulometry of 1 to 500 μm.

5. The material as claimed in claim 3, wherein the support has a specific surface of 10 to 500 m$^2$/g.

6. The material as claimed in claim 3, wherein the support has a mean pore size of 100 to 1000 Å.

7. The material as claimed in claim 1, wherein the anion-exchange polymer is obtained from an organic polymer;

wherein the organic polymer optionally has a cationic group.

8. The material as claimed in claim 7, wherein the organic polymer is selected from the group consisting of a polyvinylimidazole, a copolymer of vinylimidazole with at least one other monomer, and a polyethyleneimine.

9. The material as claimed in claim 1, wherein the metal hexacyanoferrate is selected from the group consisting of copper hexacyanoferrate, cobalt hexacyanoferrate, zinc hexacyanoferrate, cadmium hexacyanoferrate, nickel hexacyanoferrate, iron hexacyanoferrate, and a mixed hexacyanoferrate containing at least two of copper, cobalt, zinc, cadmium, nickel or iron.

10. A method of preparing the material as claimed in claim 1, comprising:

impregnating a solid support with a solution of an organic polymer to form a pellicle of the organic polymer on the solid support;

optionally, cross-linking of the polymer with a cross-linking agent;

optionally, forming a cationic group on the optionally cross-linked organic polymer;

impregnating the solid support coated with the pellicle of said organic polymer with an aqueous solution of an alkali metal hexacyanoferrate;

washing, and optionally drying, the solid support coated with the pellicle of said organic polymer to which said alkali metal hexacyanoferrate is fixed;

adding an aqueous solution of a metallic salt to the coated solid support, to form a composite solid material for fixing a mineral contaminant, comprising the solid support coated with the pellicle of said organic polymer to which an insoluble metal hexacyanoferrate is fixed; said metal hexacyanoferrate forming a thin layer on said organic polymer; and washing and drying said composite solid material;

wherein said organic polymer is an anion-exchange polymer.

11. The method as claimed in claim 10, wherein the organic polymer solution is a solution in a solvent selected from the group consisting of water, an alcohol and a mixture thereof.

12. The method as claimed in claim 10, wherein the cross-linking agent is selected from the group consisting of epichlorohydrin, 1,4-butanediol diglycidyl ether and a bis-epoxide.

13. The method as claimed in claim 10, wherein the polymer has a nitrogen atom; and wherein a cationic group is formed by quaternization.

14. The method as claimed in claim 10, wherein the alkali metal hexacyanoferrate is a hexacyanoferrate (II) or (III) of sodium or of potassium.

15. The method as claimed in claim 10, wherein the impregnation with an aqueous solution of alkali metal hexacyanoferrate is carried out at a pH of 2 to 7 which is fixed by a buffer.

16. The method as claimed in claim 10, wherein the metallic salt is selected from the group consisting of a copper salt, a cobalt salt, a nickel salt, a cadmium salt, a zinc salt and an iron salt.

17. The method as claimed in claim 10, wherein the anion of the metallic salt is selected from the group consisting of a nitrate, a sulphate, a chloride and an acetate.

18. The method as claimed in claim 10, wherein a buffer is used during said washing.

19. A method of fixing at least one mineral contaminant contained in a solution, comprising:

contacting the solution with the composite solid material for fixing a mineral contaminant as claimed in claim 1.

20. The method as claimed in claim 19, wherein the solution is an aqueous solution.

21. The method as claimed in claim 19, wherein the solution is a process liquid or an industrial effluent.

22. The method as claimed in claim 19, wherein the solution is a liquid or an effluent which has been in contact with a radionuclide.

23. The method as claimed in claim 19, wherein the method is carried out continuously.

24. The method as claimed in claim 23, wherein the composite solid material for fixing a mineral contaminant is packed in a column.

25. The method as claimed in claim 19, wherein the contaminant is present at a concentration of 0.1 picograms to 100 mg/l.

26. The method as claimed in claim 19, wherein the contaminant is obtained from a metal or from a radioactive isotope of the metal.

27. The method as claimed in claim 26, wherein the contaminant is an anionic complex, a colloid, or a cation of said metal or said radioactive isotope of said metal.

28. The method as claimed in claim 19, wherein the contaminant is selected from the group consisting of Cs, Co, Ag, Ru, Fe and Tl and the isotopes thereof.

* * * * *